US010123226B2

(12) United States Patent
Gupta et al.

(10) Patent No.: US 10,123,226 B2
(45) Date of Patent: Nov. 6, 2018

(54) DETECTION OF ACTIVE LISTENERS AND DYNAMIC PROVISIONING OF CELL SITES FOR BROADCAST

(71) Applicant: AT&T Intellectual Property I, L.P., Atlanta, GA (US)

(72) Inventors: Gaurav Gupta, Redmond, WA (US); Rajendra P. Kodaypak, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/957,211

(22) Filed: Dec. 2, 2015

(65) Prior Publication Data

US 2017/0164372 A1   Jun. 8, 2017

(51) Int. Cl.
   *H04W 72/00*   (2009.01)
   *H04W 24/08*   (2009.01)
   *H04W 4/06*    (2009.01)

(52) U.S. Cl.
   CPC ............. *H04W 24/08* (2013.01); *H04W 4/06* (2013.01)

(58) Field of Classification Search
   CPC ...... H04W 24/08; H04W 4/06; H04W 76/002
   See application file for complete search history.

(56) References Cited

U.S. PATENT DOCUMENTS

| 7,917,150 | B2 | 3/2011 | Kim et al. |
| 8,165,122 | B2 | 4/2012 | Kotalwar et al. |
| 8,446,919 | B2 | 5/2013 | Huang et al. |
| 8,473,984 | B1 | 6/2013 | Harmon et al. |
| 8,819,264 | B2 | 8/2014 | Rodrigues |
| 9,030,988 | B2 | 5/2015 | Sayeed et al. |
| 2004/0042479 | A1* | 3/2004 | Epstein ............... H04L 12/1845 370/432 |
| 2005/0070301 | A1* | 3/2005 | Caspi .................... H04L 67/24 455/456.1 |
| 2008/0192697 | A1* | 8/2008 | Shaheen ........... H04W 36/0061 370/331 |
| 2010/0131995 | A1 | 5/2010 | Guo et al. |

(Continued)

FOREIGN PATENT DOCUMENTS

| WO | WO 2011104115 A1 | 9/2011 | |
| WO | WO 2013182247 A1 * | 12/2013 | ............. H04W 4/06 |

*Primary Examiner* — Kathy Wang-Hurst
*Assistant Examiner* — Said M Elnoubi
(74) *Attorney, Agent, or Firm* — Zagorin Cave LLP

(57) ABSTRACT

In order to dynamically allocate spectrum resources to broadcast and unicast operations, user equipment (UE) sends a start message to a broadcast multicast tracking application in response to the UE deciding to start receiving a content stream. The start message includes cell site information where the user equipment is located and a channel identification indicating the content stream. The tracking application tracks the number of active listeners to the content stream in the cell and based on the number of active listeners and cell utilization, determines whether to initiate a broadcast. If the broadcast is initiated, the tracking application sends a message to the UE to retune to a broadcast channel. The UE sends a stop message when the UE decides to stop receiving the content stream and the tracking application and determines whether to terminate the broadcast based on the remaining active listeners and the cell utilization.

17 Claims, 9 Drawing Sheets

(56) References Cited

U.S. PATENT DOCUMENTS

| | | |
|---|---|---|
| 2010/0165905 A1* | 7/2010 | Kanazawa .......... H04W 72/005 |
| | | 370/312 |
| 2010/0197265 A1 | 8/2010 | Dorenbosch et al. |
| 2010/0223357 A1* | 9/2010 | Einarsson ......... H04L 29/06027 |
| | | 709/219 |
| 2013/0276017 A1* | 10/2013 | Walker ............. H04N 21/44204 |
| | | 725/25 |
| 2013/0294321 A1 | 11/2013 | Wang et al. |
| 2014/0362694 A1 | 12/2014 | Rodrigues |
| 2015/0040162 A1 | 2/2015 | Kotecha et al. |

* cited by examiner

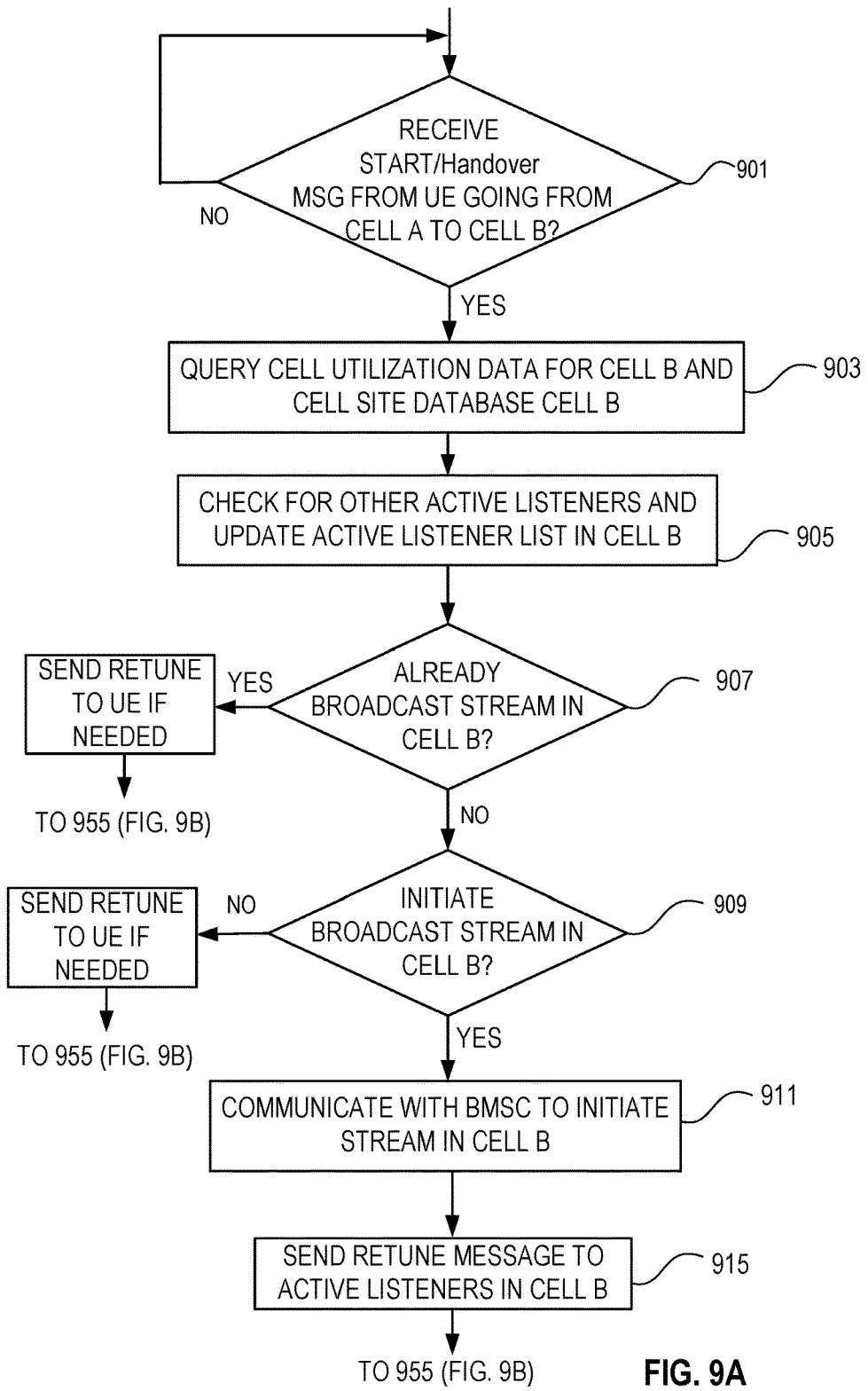

DETECTION OF ACTIVE LISTENERS AND DYNAMIC PROVISIONING OF CELL SITES FOR BROADCAST

BACKGROUND

3$^{rd}$ Generation Partnership Projection (3GPP) Long Term Evolution (LTE) broadcast is a key technology enabler for effective utilization of radio spectrum, as well as utilization of access and core network resources that are deployed to provide mobility services in the telecommunication operator's Internet Protocol (IP) mobility network infrastructure. As LTE network deployments become widespread and mature globally, rapid advances in radio technologies such as 5G and small cells will pave the way for innovative ways of coordinating and utilizing these critical network resources to be able to deliver high-speed mobile multimedia broadcast multicast services. The volume of cell sites (macro eNodeBs and small cells) in the network continues to grow to meet the radio-sector capacity needs as well as serve the traffic demands from mobile customers.

One way to deal with growing demand is to provide multicast and broadcast services. LTE has defined evolved Multimedia Broadcast and Multicast Services (eMBMS) to support broadcast/multicast services in cellular networks. LTE utilizes Multicast Broadcast Single Frequency Network (MBSFN) to broadcast the same information using the same radio resources from synchronized neighboring base stations.

Allocation of spectrum resources to broadcast operations may be static. For example, a particular cell may devote 20% of available spectrum to broadcast and 80% to service unicast operations. The static allocation of resources may adversely affect both broadcast and unicast operations by misallocating scarce radio resources. Such misallocation can be more critical in dense urban locations where cells are starved of suitable LTE spectrum resources.

SUMMARY OF EMBODIMENTS

Accordingly, in order to dynamically allocate spectrum resources to broadcast and unicast operations, in an embodiment a method includes receiving at a broadcast multicast tracking application a message sent from first user equipment to the broadcast multicast tracking application. The message includes information indicative of a cell site in which the user equipment is located and a channel identification indicative of a content stream. The method further includes initiating a broadcast stream to the first user equipment based at least in part on a number of active listeners receiving the content stream corresponding to the channel identification. The method further includes sending a message to the first user equipment to retune to a broadcast channel carrying the stream from a unicast channel carrying the content stream if the broadcast stream is initiated.

In another embodiment, an apparatus includes a processor and a memory in communication with the processor. The memory includes computer-executable instructions that, when executed by the processor, cause the processor to perform broadcast multicast tracking application operations. The broadcast multicast tracking application operations include, updating a number of active listeners receiving the content stream responsive to receiving a message sent from first user equipment, the message including information indicative of a cell site in which the user equipment is located and a channel identification indicative of a content stream. The broadcast multicast tracking application operations further include causing a broadcast stream to be initiated to the first user equipment based, at least in part, on the number of active listeners being above a threshold. The broadcast multicast tracking application operations further include causing a message to be sent to the first user equipment to retune to a broadcast channel carrying the content stream from a unicast channel carrying the content stream.

In another embodiment, a method includes receiving at a broadcast multicast tracking application an indication that first user equipment is being handed over from a first cell site to a second cell site. The method includes accessing utilization information for the second cell site and updating a number of active listeners in the second cell site. The method further includes determining whether to initiate a broadcast of the content stream in the second cell site on a broadcast channel based, at least in part, on the number of active listeners in the second cell site and the utilization information. If a determination is made to initiate the broadcast stream, sending a retune message to one or more user equipment in the second cell site receiving the content stream on one or more unicast channels to retune to the broadcast channel.

BRIEF DESCRIPTION OF THE DRAWINGS

The present disclosure may be better understood, and its numerous objects, features, and advantages made apparent to those skilled in the art by referencing the accompanying drawings.

FIG. 9A illustrates a flow diagram illustrating an aspect of active user tracking for a target cell in response to a handover.

The use of the same reference symbols in different drawings indicates similar or identical items.

DETAILED DESCRIPTION

Wireless communication networks provide unicast and broadcast modes of communication. In unicast operation, a base station such as an eNodeB, also referred to sometimes as an access point in some wireless technologies, establishes a radio link with a single user equipment (UE). Multiple UEs may be in simultaneous communication with the eNodeB in separate unicast operations. The radio link may utilize Orthogonal Frequency Division Multiple Access (OFDMA)

or another multiple access scheme in which multiple users are simultaneously in communication with an eNodeB. In broadcast or multicast communications, the eNodeB transmits the same information to multiple UEs at the same time over the same channel, where channel refers to the same frequency (or subcarriers).

User equipment (UE) can only be in the Connected state during LTE data connections, but for broadcast reception, the UE can either be in the Idle or Connected state. Today, access networks do not monitor active broadcast users/listeners in idle state, especially at the cell-sector level. That can result in inefficient utilization of scarce radio resources, which otherwise could have been used for contending unicast data users for higher capacity/service quality.

As mentioned above, a user can listen to broadcast channels in wireless networks in Idle state. Access networks do not have a way to monitor active broadcast/multicast listeners in Idle state, especially at the cell-sector level. The inability to determine active listeners to LTE broadcast content, can cause the operator to waste valuable radio resources by over allocating resources to unicast or broadcast. If a cell is heavily loaded (e.g., users with internet traffic), then adding any LTE Broadcast channel can yield poor service to all users as scarce spectrum is being allocated to broadcast services. A user can move from one cell site to another while watching LTE Broadcast content, and unless LTE Broadcast is enabled on all cells, the user cannot watch seamlessly. But currently that requires dedicated and static allocation of broadcast spectrum. Further, the network operator may require a license to enable LTE Broadcast across all cell sites. The operator needs to determine the pattern or route (such as freeway etc.) of moving users to enable LTE Broadcast only across those cell sites to save on licensing costs but at the expense of additional operator requirements.

Figure 1:
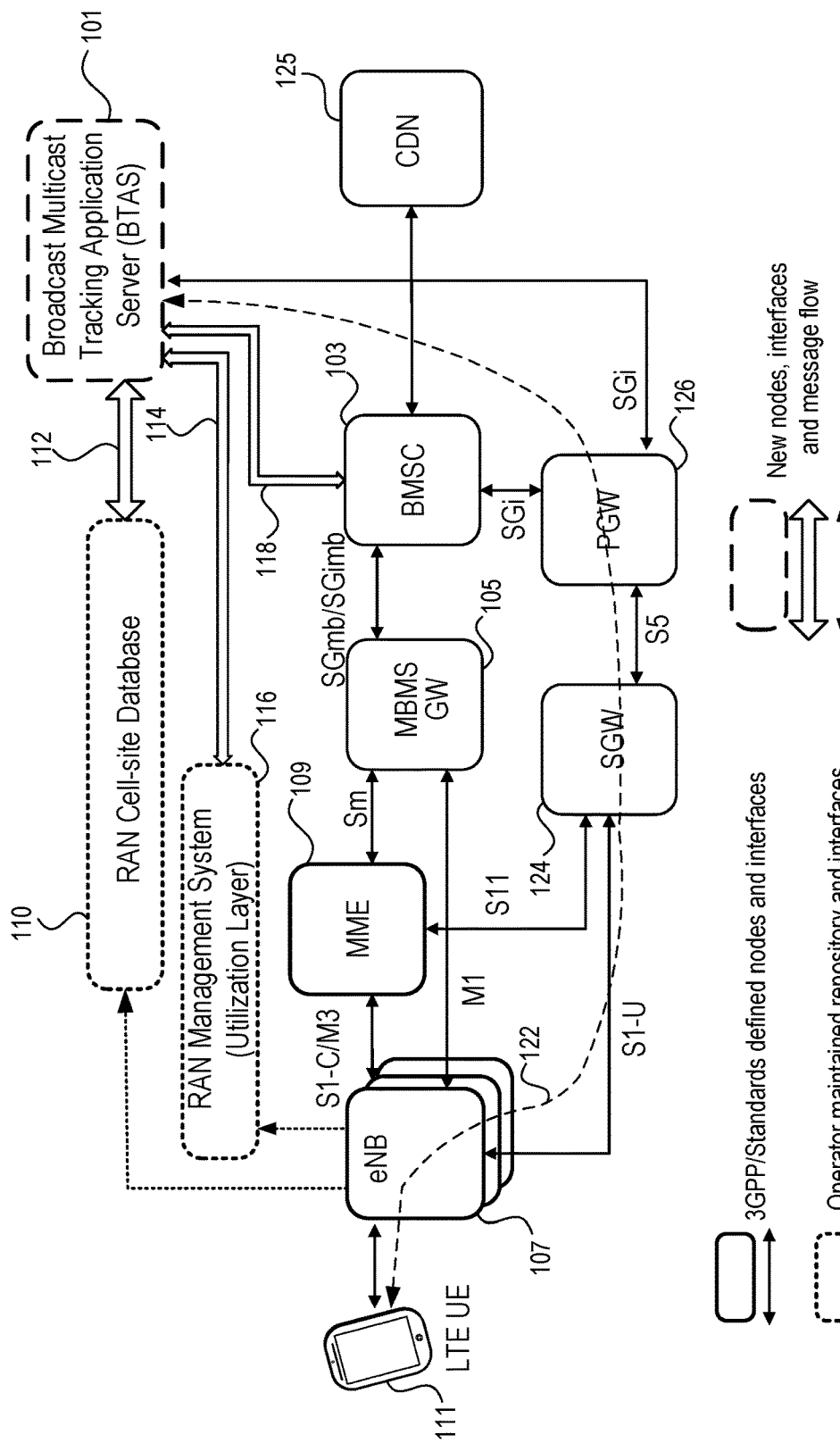
FIG. 1 illustrates an example architecture that provides tracking of active users of content streams within a cell.

Accordingly, in order to provide greater flexibility and efficiency in providing broadcast/multicast services a broadcast/multicast tracking capability is provided that tracks active (and potential) broadcast/multicast users. Referring to FIG. 1 a broadcast multicast tracking application server (BTAS) 101 acts as an application function interfacing to the key LTE core network elements and their element management systems. FIG. 1 shows standard 3GPP defined nodes, operator maintained nodes or repositories that may be utilized in the telecommunications network, and a new node BTAS 101, which interfaces with the Broadcast Multicast Service Center (BMSC) node 103 to initiate and terminate broadcast operations over interface 118. The BMSC node 103 facilitates delivery of broadcast content through the Multimedia Broadcast Multicast Services gateway (MBMS GW) 105, which supplies eNodeB(s) 107 over user plane interface M1 with user packets for broadcast. Control information is supplied from Mobility Management Entity (MME) 109. The BTAS 101 also interfaces with operator maintained RAN cell site database system 110 over interface 112. The RAN cell site database system 110 maintains cell site information including latitude/longitude of the cell site, a cell identification number, carrier frequency, services supported and/or restricted per carrier frequency, if any, and state of the eNodeB (online, offline, maintenance mode, etc.). The BTAS 101 also interfaces with the unified RAN Management System (Utilization Layer) 116 over interface 114. The RAN Management System (Utilization Layer) 116 supplies RAN specific information such as cell loading (e.g., available or utilized carrier-bandwidth), spectrum allocation for unicast/broadcast, broadcast channel information and tuning mechanism (unicast/broadcast) for a particular UE being served by a cell. Note that when the term "broadcast" is used herein, it is intended to include transmission to more than one UE and thus includes multicast operations.

The eNodeB 107 serves UE 111. In embodiment, as described further herein, at the initiation of a broadcast session, the UE 111 goes into the ECM_Connected state in order to send a START message to BTAS 101. The EPS Connection Management (ECM) connected states (ECM-Connected, ECM-Idle) describe signaling connectivity between the UE and the Evolved Packet Core (EPC). The START message from the UE to BTAS 101, in addition to indicating the start of a content stream, includes a channel identification information that identifies the content stream which the UE has selected. Note that the content may be video, such as a live TV broadcast, or a live radio broadcast, or another content stream. Thus, the channel identification information may indicate a network, e.g., NBC, CNN, or a particular sporting event, concert, or radio station. The channel identification information may be in any descriptive or metadata type language such as an object identifier within a file, an embedded URL, XML, or other form of identification. The content stream may be other than audio or video, e.g., the stream may be provided to a cluster of Internet of Things (IoT) devices simultaneously that are present in a particular cell site. Thus, the content stream may be an operating system update or other content for the IoT devices The START message also includes RAN parameters that includes cell site identification information identifying the cell site in which the UE is located. The cell site information known to the UE may vary among cell sites and may include a local cell site identification, latitude/longitude information, or other information that can be used by the BTAS 101 to identify the cell site. The other information could include Global Positioning System (GPS) coordinates of the UE, or other positioning approaches such as Observed Time Difference Of Arrival (OTDOA), Enhanced Cell ID (E-CID), Assisted GPS (AGPS), or any other beacon type terrestrial technology or a combination of any of the location information described herein or otherwise available. The START message also includes a UE identifier. The START message path 122 to the BTAS 101 includes the Serving Gateway (SGW) 124 using interface S1-U, the Packet Data Network Gateway (PGW) 126 using interface S5, and from PGW 126 to BTAS 101 through the packet data network.

In addition to a START message, the UE provides a STOP message when the UE terminates the content stream. For example, the user may turn off the content stream, which triggers a STOP message that includes an indication that receipt of the content stream is being terminated, RAN parameters providing cell ID information, and content stream channel information. By using both START and STOP messages, the BTAS can accurately track UEs that are actively listening to particular content streams in particular cells.

Figure 2:
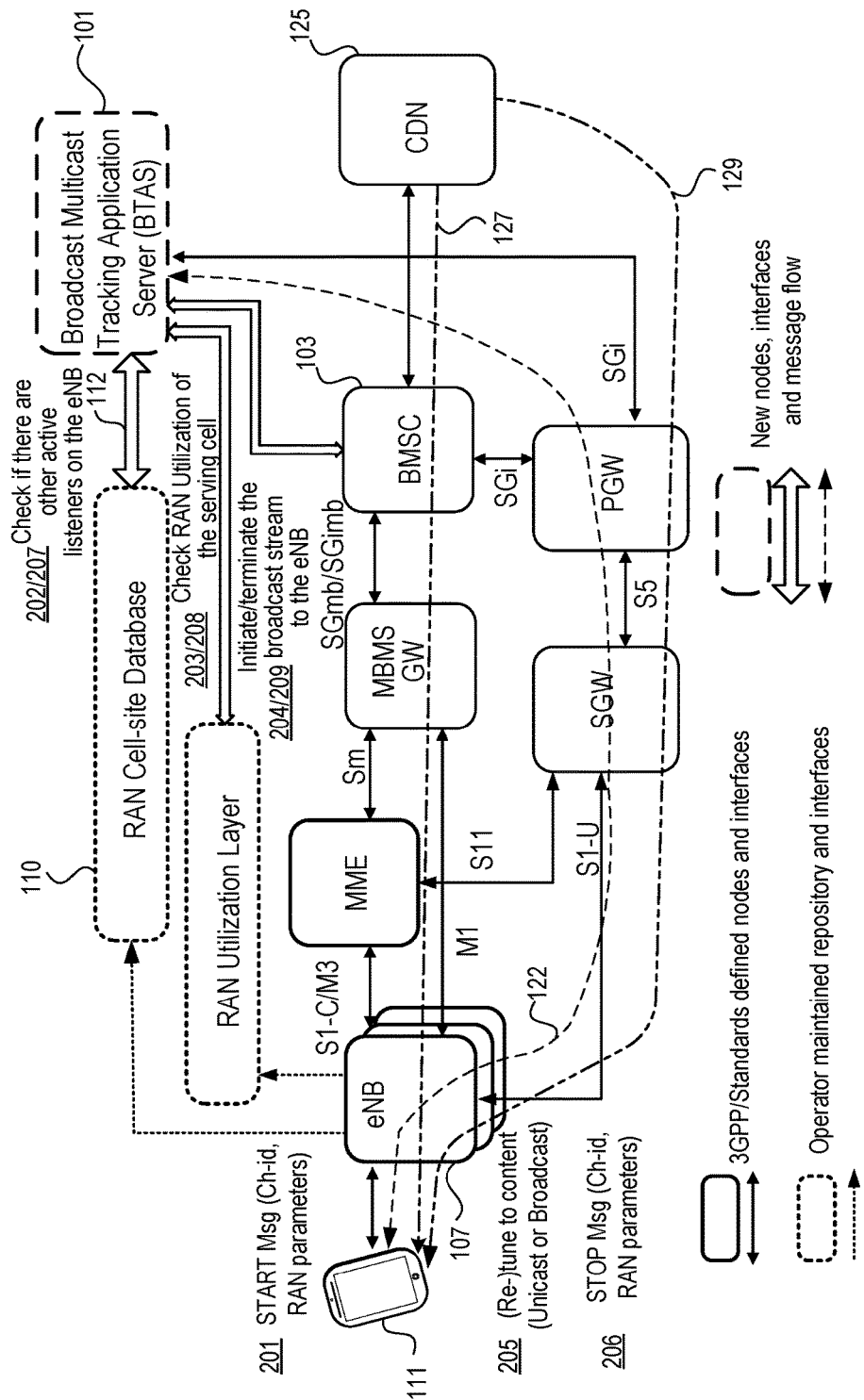
FIG. 2 illustrates a use case of the architecture embodiment shown in FIG. 1.

Referring to FIG. 2, illustrated is a use case of the architecture embodiment shown in FIG. 1. At 201, the UE send a START message that includes the channel ID, and RAN parameters identifying the cell site. The message is received by the BTAS 101 and in response at 202 BTAS 101 extracts the cell ID information from the RAN cell site data base 110 to obtain an updated view of the cells and broadcast serving area mappings and to correlate the RAN parameters received in the START message with the RAN cell site data base 110. For example, a latitude/longitude information may be used to identify the cell site by number. In that way, even if the information on cell ID provided in the START message is different from the way the information is stored in the RAN cell-site database, the information provided in the START message can be used to extract the actual cell ID.

At 203, the BTAS checks the RAN utilization of the serving cell by querying RAN Utilization Layer of RAN Management System 116. Several different utilization scenarios are possible. For example, the BTAS may learn that the cell is heavily loaded in terms of carrier-bandwidth utilization and based on BTAS tracking, BTAS knows that a threshold number of UEs in the serving cell are tuned to the same content stream in unicast mode. The threshold number may depend on the particular loading of the cell, time of day, type of cell (macro, small cell), or other factors. In one embodiment, the threshold number of UEs may be 10 and other embodiments the threshold number may be 2 or 20 depending on the factors listed above and/or other factors. If the BTAS determines the cell is heavily loaded at 203 and the number of users is above the threshold, the BTAS 101 makes the decision to initiate the broadcast stream to the serving eNodeB and at 204 communicates the cell ID and the content stream identification information (channel) to BMSC 103 to initiate the broadcast stream. The BMSC 103 initiates the broadcast conventionally with content provided by content delivery network (CDN) 125 over path 127. Note that the CDN may also provide content in a unicast mode over path 129.

The BTAS also sends a message over path 122 to the UE 111 to tune to the broadcast channel. At 205, the UE 112 receives the message and retunes to the broadcast channel to receive the content stream previously received over a unicast channel.

FIG. 2 also illustrates a use case for the STOP message. At 206, the UE decides to stop receiving the content stream. Typically that is a result of the user stopping the stream, changing the channel, powering off the UE, or another action that the UE determines will result in stopping receipt of the content stream. The UE sends the STOP message to the BTAS and at 207, the BTAS receives the STOP message, and queries the RAN cell-site database at 207 and the RAN utilization Layer of the RAN Management System 116 at 208. The BTAS confirms the cell site from RAN cell-site database 110 based on RAN parameters in the STOP message identifying the cell site. The BTAS 101 removes the UE from the active listener list maintained by the BTAS and makes a determination as to whether to terminate the broadcast stream. Assume, based on the loading of the cell site and the number of active listeners being below a threshold, the BTAS 101 makes the decision to terminate the broadcast stream. For example, when UE 111 drops the stream, there may be no active listeners left. BTAS communicates with BMSC 103 to provide the cell ID and the content stream ID to the BMSC to stop the broadcast and the broadcast is stopped. If there are active listeners left and the BTAS has made the decision to stop the broadcast given the loading and the number of active listeners, the BTAS sends a retune message to remaining active listeners in the serving cell to retune to unicast from broadcast. Note that the retune message may be sent such that the broadcast is not stopped before the UEs have a chance to retune so there is no interruption of the stream.

Figure 3:
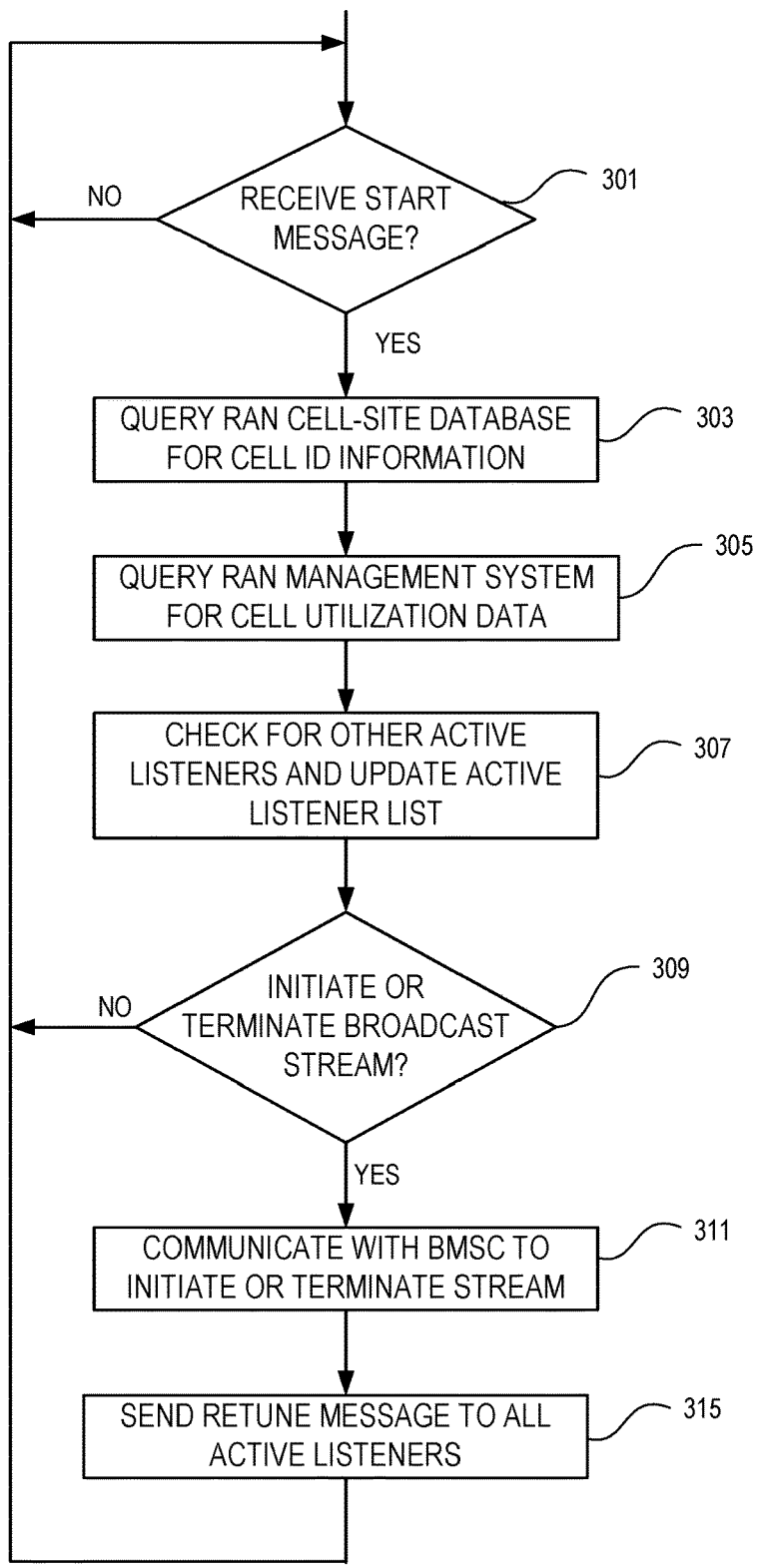
FIG. 3 illustrates an example flow diagram for responding to a START message from the perspective of the broadcast multicast tracking application server (BTAS).

FIG. 3 illustrates a flow diagram for responding to a START message from the perspective of the BTAS. At 301 the BTAS waits for a START message. Upon receipt of a START message, the BTAS queries the RAN cell site database 110 to confirm the cell site. At 305 the BTAS queries the RAN Management System 116 to obtain RAN utilization data for the serving cell. The BTAS ensures authenticity of the serving cell ID information in the START message and its mapping to the broadcast serving area for the broadcast channel identified in the START message by comparing the information received from the cell site database 110 and from RAN Management System 116 including broadcast channel information, and the tuning mechanisms (unicast/broadcast) being used for the various UEs in the serving cell. At 307 the BTAS checks for other active listeners and updates the active listener list by adding the UE to the active user list of the cell site along with the channel identification received in the START message. At 309, the BTAS determines whether to initiate or terminate a broadcast stream in response to the START message, based on such factors as the loading of the cell and the number of active listeners. For example, if the number of active listeners is low but the loading of the cell is high with unicast operations, a decision to not initiate a broadcast stream may be made so as to keep more cell resources for unicast operations. If the number of active listeners is high, the decision may be made to initiate the broadcast stream to free up cell resources. Again, multiple factors may be weighed in determining whether to initiate the broadcast stream. If the decision at 309 is yes, the BTAS then communicates with BMSC 103 in 311 to initiate the broadcast stream to the particular eNodeB. If the decision is No, the BTAS flow returns to wait for the next START message in 301. At 315, the BTAS sends a retune message to all of the UE active listeners in the serving cell to retune the content stream to the broadcast channel. The BTAS then returns to 301 to wait for the next START message.

Figure 4:
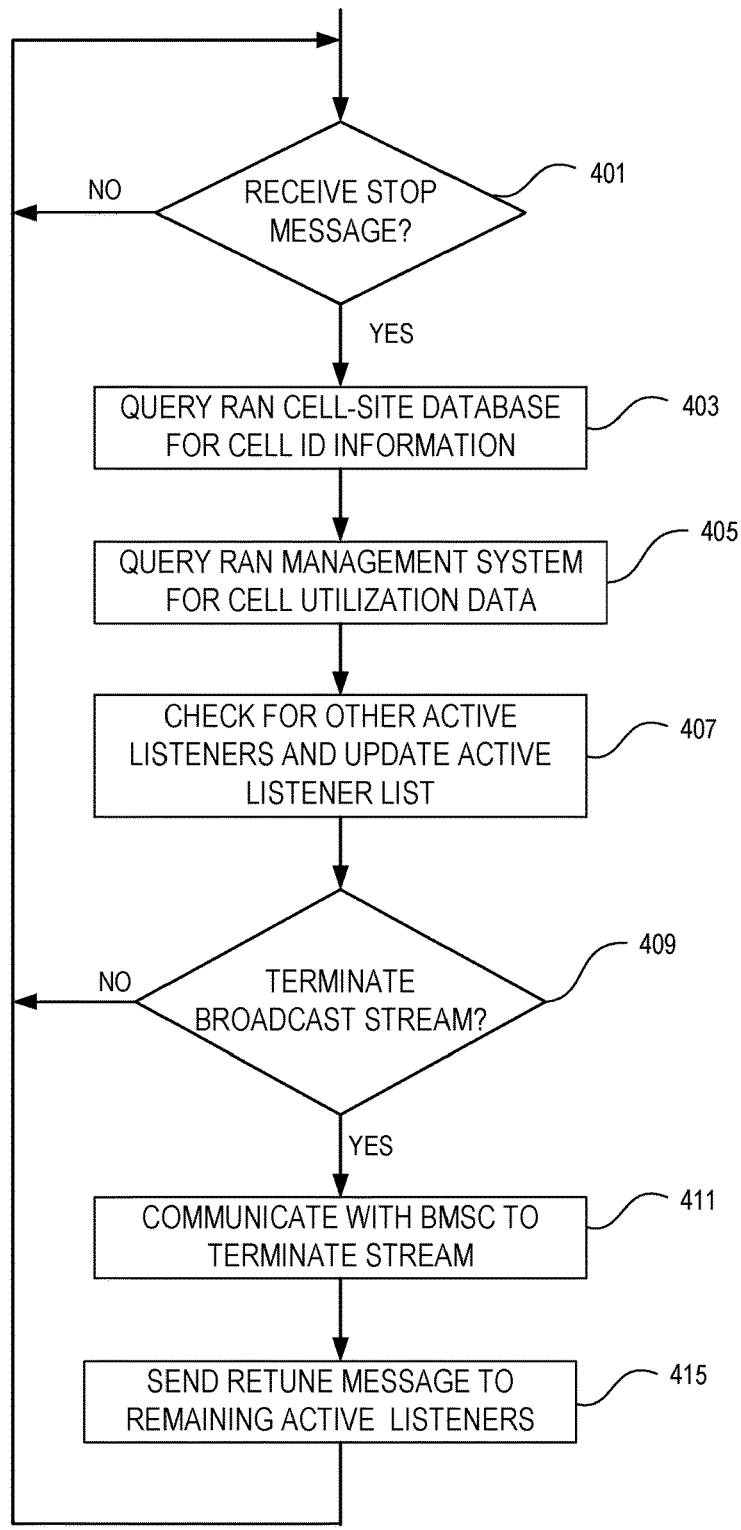
FIG. 4 illustrates an example flow diagram for responding to a STOP message from the perspective of the broadcast multicast tracking application server (BTAS).

FIG. 4 illustrates a flow diagram for responding to a STOP message from the perspective of the BTAS. Many of the operations are identical to those carried out for the START message but the decisions as to whether to stop or initiate a broadcast stream may be based on somewhat different criteria. At 401 the BTAS waits for a STOP message. Upon receipt of a STOP message the BTAS queries the RAN cell site database at 403 to confirm the cell site information in the STOP message. At 405 the BTAS queries the RAN Management System 116 to obtain RAN utilization data for the serving cell. The BTAS ensures authenticity of the serving cell ID information in the STOP message and its mapping to the broadcast serving area for the broadcast channel identified in the STOP message by comparing the information received from the cell site database 110 and from RAN Management System 116 including broadcast channel information, and the tuning mechanisms (unicast/broadcast) being used for the various UEs in the serving cell. At 407 the BTAS updates the active listener list in 405 by removing the UE from the active listener list for the serving cell site and checks for other active listeners. At 409, the BTAS determines whether to terminate the broadcast stream associated with the STOP message. That determination may be made based on the loading of the cell, and the number of remaining active listeners. For example, if the number of active listeners is low (or high) but the loading of the cell is low, a decision to not terminate the broadcast stream may be made. If the number of active listeners is now zero, the broadcast stream may be terminated to free up cell resources. Again, multiple factors may be considered in determining whether to terminate the broadcast stream. If the decision at 409 is yes to terminate the stream, the BTAS communicates with BMSC 103 in 411 to terminate the broadcast stream identified in the STOP message to the particular eNodeB also identified in the STOP message. If the decision is No, the BTAS flow returns to wait for the next STOP message. At 415, the BTAS sends a retune message to any remaining active listeners in the serving cell to retune the content stream to unicast operation. The BTAS then returns to 401 to wait for the next STOP message.

Figure 5:
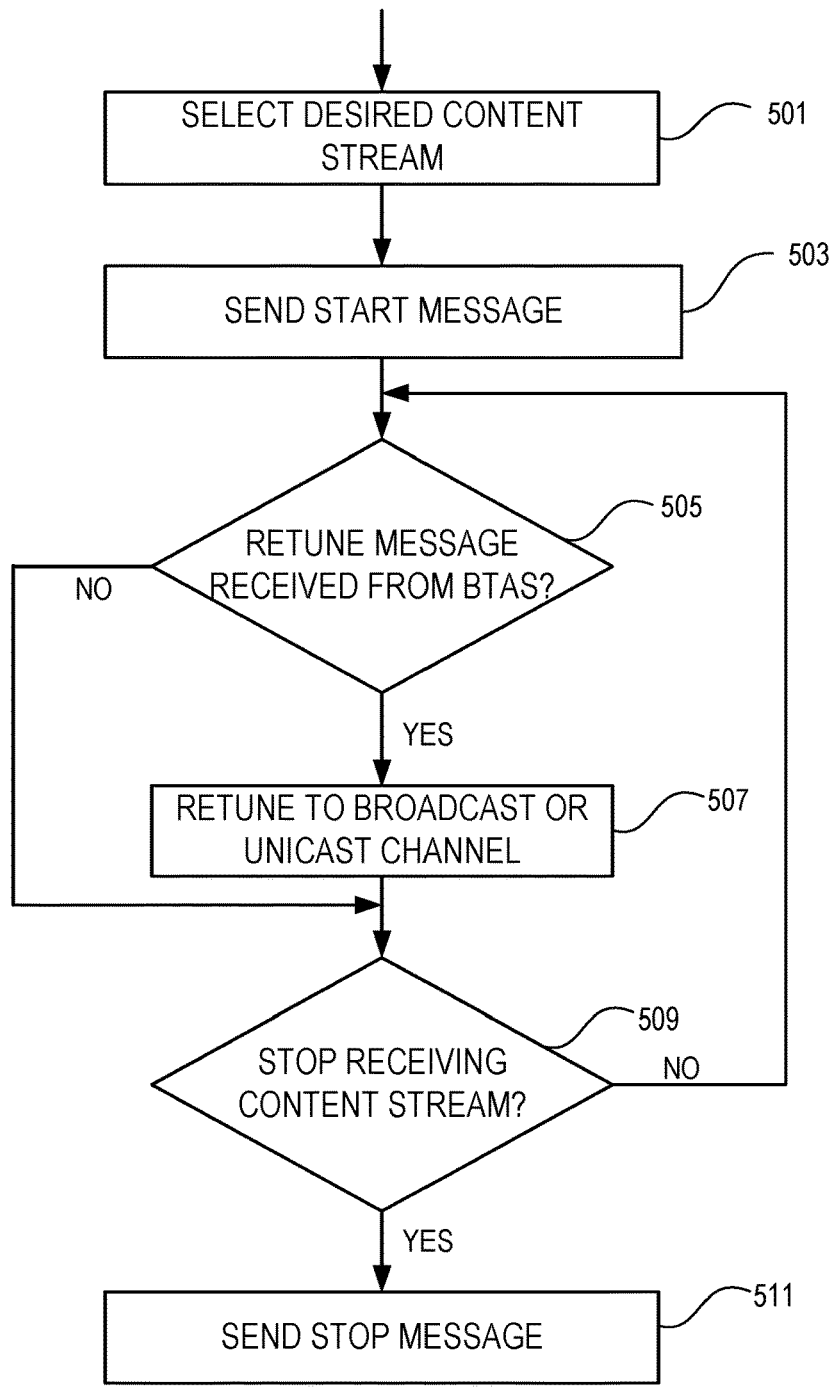
FIG. 5 illustrates a flow diagram for active tracking from the perspective of the UE.

FIG. 5 illustrates a flow diagram for active tracking from the perspective of the UE 111. When the UE 111 selects a desired content stream at 501, the UE sends a start message at 503 and tunes to the content stream. That content stream may be supplied on a unicast or broadcast channel. Regardless, the UE has to enter the Connected state to send the START message. The UE may receive a retune message at 505 to retune to a unicast or broadcast channel depending on the determination of the BTAS. If a retune message is received at 505, the UE retunes to the specified channel in 507. The retune message may occur because, e.g., some or all other UEs in the cell have stopped listening to the content stream and unicast operation has been selected by the BTAS or because the BTAS has decided to initiate a broadcast. In 509 if the UE does not stop receiving the content stream, the UE returns to 505 to check if a retune message has been received. When the UE finally decides to stop receiving the content stream, the UE sends the stop message in 511.

The trigger for the UE to send the START and STOP messages may be associated with access to content received and identified in a Content Catalog. The Content Catalog has a list of various content and associated metadata that differentiates between audio/video/mixed content. The Content Catalog in the UE may be a result of a combination of network push or UE fetch/pull. The UE may be triggered to send a START message in response to the UE selecting the content stream listed in the Content Catalog in 501 and triggered to send a STOP message in response to the UE stopping the content stream listed in the Content Catalog in 509.

The BTAS 101 can also poll the PGW 126 for extracting UE location information, e.g., if the UE has not sent a STOP message after a predetermined time threshold. Generally, MME 109 sends more granular information in the Private Extension Information Element in the GPRS Tunneling Protocol v2 (GTPv2) message towards the SGW 124, which is forwarded to the PGW. That polling may be useful if the UE experiences a transient network loss or goes out of coverage and is unable to send the STOP message.

Figure 6:
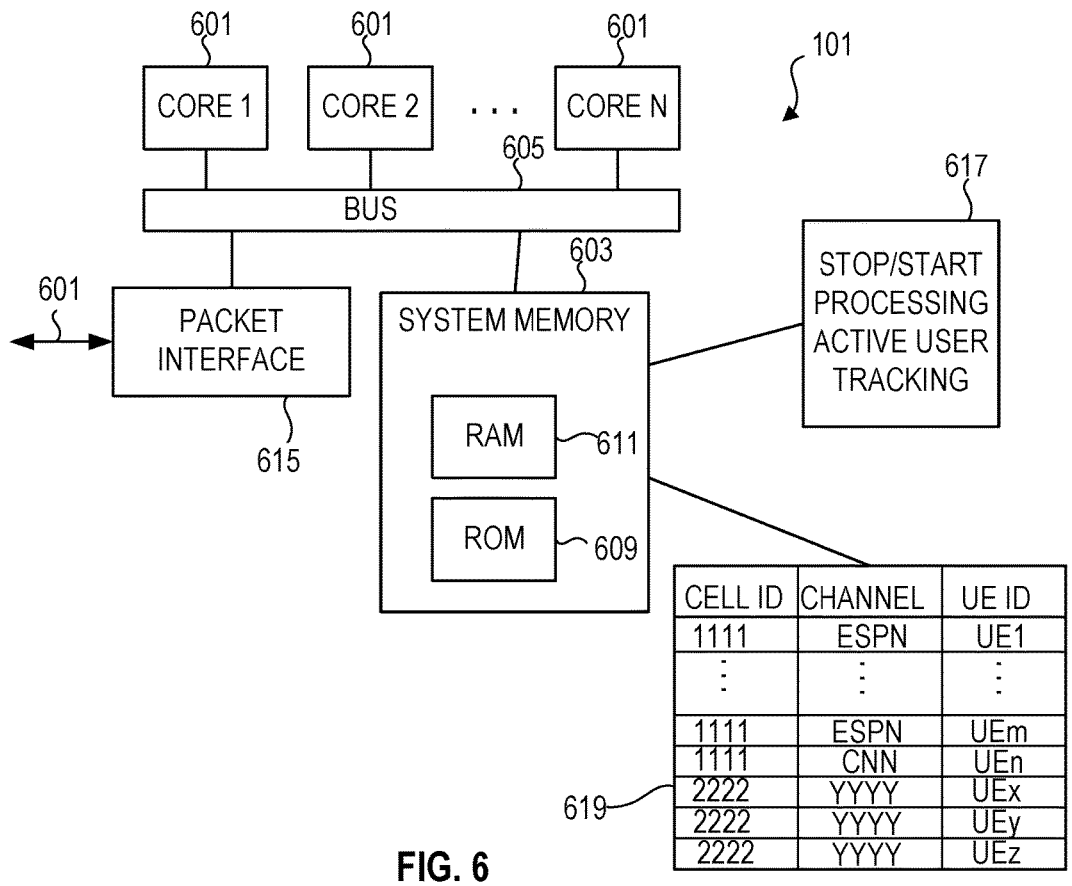
FIG. 6 illustrates a high level simplified block diagram of a processor system that may be utilized to implement the BTAS.

FIG. 6 illustrates a high level simplified block diagram of a processor system that may be utilized to implement the Broadcast Multicast Tracking Application server 101. In embodiments, the BTAS function may be realized as a standalone application server or a group of servers and deployment configurations can vary depending on the actual network design. In other embodiments, the functionality provided by BTAS 101 may be incorporated in other network nodes and be part of another server. The following description in conjunction with FIG. 6, is intended to provide a brief, general description of a suitable processing system, which can be used with one or more embodiments described herein. With reference again to FIG. 6, the processor system includes one or more processing cores 601, a system memory 603 and a system bus 605. The system bus may be used to couple various system components including, but not limited to, the system memory 603 and the cores 601. The tracking functionality described, e.g., in FIGS. 3, 4, 9A, and 9B and the queries associated with FIG. 2, and the communications to BMSC 103 may be implemented in software modules 617 stored in system memory 603 and executed by one or more of the cores. The software or program modules are computer-executable instructions that operate on one or more of the cores 601 for performing the functions described herein. Generally, program modules include routines, programs, components, data structures, etc., that perform particular tasks. The system bus 605 can be any of several types of bus structures that can further interconnect to a memory bus (with or without a memory controller), a peripheral bus, and a local bus using any of a variety of commercially available bus architectures. The system memory 603 may include nonvolatile memory 609 and volatile memory 611. A basic input/output system (BIOS) can be stored in the non-volatile memory such as ROM, erasable programmable read only memory (EPROM), EEPROM, which BIOS contains the basic routines that help to transfer information between elements within the processor, such as during startup. As used herein, terms such as "memory", "storage", data storage," and substantially any other information storage component relevant to operation and functionality of a component, refer to any form of memory that can store information and be read by computers or processors or other electronic components. Memory may be volatile memory or nonvolatile memory, or both.

Memory 603 may be used to store the active memory list 619. The active memory list may include the CELL ID, the content CHANNEL, and the UE ID for each cell being controlled by BTAS 101. In the exemplary active listener list 619, cell IDS 1111 and 2222 are being monitored by the BTAS 101. As shown in FIG. 6, UEs in a particular cell may be viewing multiple channels, e.g., ESPN and CNN, and multiple channels have the potential to be broadcast and be tracked by BTAS 101. The processor system also includes one or more external interfaces 615 to couple to a packet network. Thus, interface 615 may provide an interface to communicate with the packet network to talk to other network nodes. Other communication channels and technologies are within contemplation of the embodiments described herein and may be utilized as needed in various embodiments. The systems and methods described herein can be implemented utilizing various commercially available operating systems or combinations of operating systems.

Figure 7:
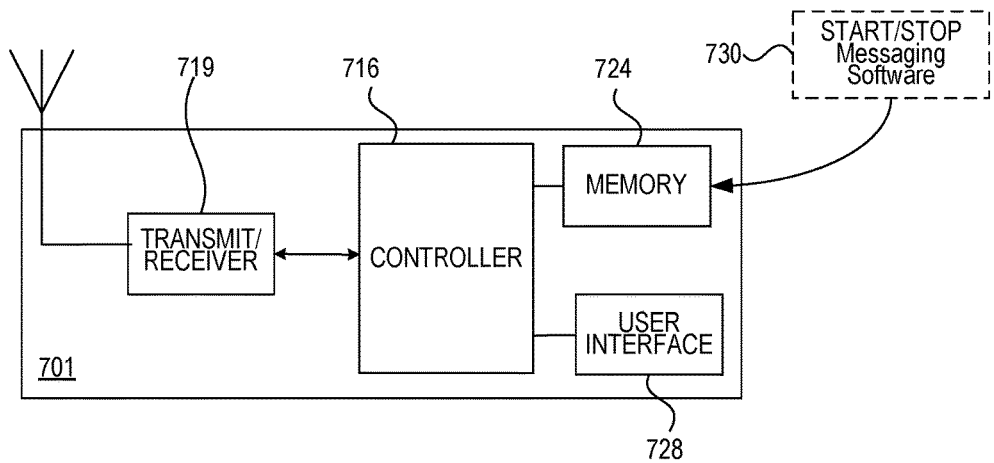
FIG. 7 illustrates high level block diagram of an example of user equipment.
Figure 8:
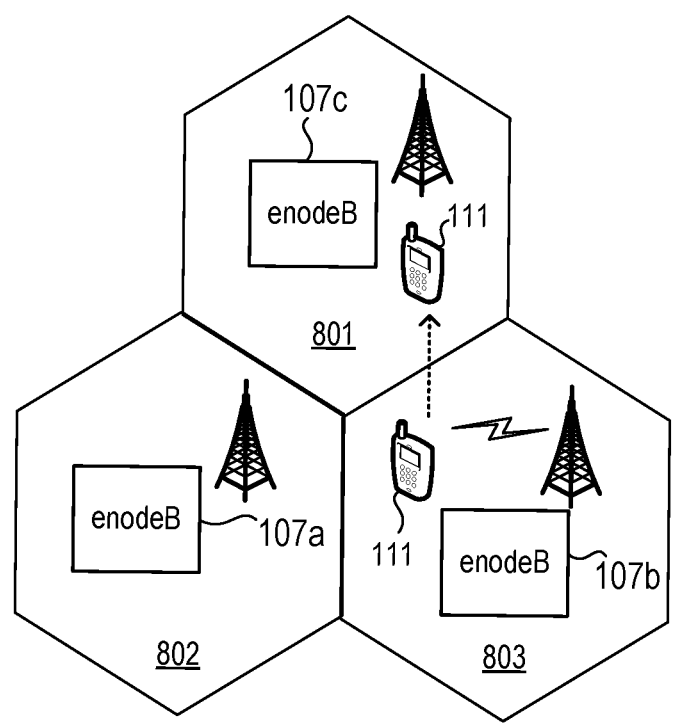
FIG. 8 illustrates a handoff scenario.

FIG. 7 illustrates high level block diagram of an example of user equipment 701 that may be utilized as the UE 111 shown FIGS. 1, 2, and 8. The components of the exemplary UE 701 are either generally known in the art or based on those generally known in the art, although functionally some of those components have been modified or enhanced as described herein with respect to the present disclosure. The user equipment 701 may be a mobile phone, laptop, tablet, wearable device, be installed in an automobile or in any number of other configurations including Internet of Things (IoT) devices. The mobile device 701 includes a controller 716, such as a processor, microcontroller or similar data processing device that executes program instructions stored in a memory 724. The UE 701 can communicate in at least one and often multiple radio access technologies and includes a transmit/receiver 719. Typical transmitter functions including coding, mapping, and modulation are known in the art and are therefore not shown in any detail. Typical receiver functions, which are well known in the art and therefore not shown in any detail, include, e.g., intermediate frequency to baseband conversion, demodulation, constellation demapping, decoding, and/or descrambling according to the particular RF protocols and technology being employed. The receiver functions may be implemented in various combinations of analog and digital logic. In particular, the transmit and receiver functions may use digital signal processing and controller 716 represents the necessary digital signal processing capability to implement necessary digital signal processing functions, even though one or more separate digital signal processors may be provided in user equipment 701.

The controller 716 may be implemented as a single special purpose integrated circuit (e.g., ASIC) having a main or central processor unit for overall, system-level control, and separate sections dedicated to performing various specific computations, functions and other processes under the control of the central processor unit. The controller 716 can also be implemented as a single microprocessor circuit, a digital signal processor (DSP), or a plurality of separate dedicated or programmable integrated or other electronic circuits or devices, e.g., hardwired electronic or logic circuits such as discrete element circuits or programmable logic devices. The controller 716 may also include other circuitry or components, such as memory devices, relays, mechanical linkages, communications devices, drivers and other ancillary functionality to affect desired control and/or input/output functions.

The memory 724 may be implemented using any appropriate combination of alterable, volatile or non-volatile memory or non-alterable, or fixed memory. The alterable memory, whether volatile or non-volatile, may be implemented using any one or more of static or dynamic RAM, a floppy disk and disk drive, a writable or re-writable optical disk and disk drive, a hard drive, flash memory or other alterable memory components known in the art. Similarly, the non-alterable or fixed memory may be implemented using any one or more of ROM, PROM, EPROM, EEPROM, an optical ROM disk, such as a CD-ROM or DVD-ROM disk, and disk drive or other non-alterable memory known in the art.

The controller 716 is operatively coupled with user interface 728. The user interface 728 may include items known in the art, such as a display, keypad, speaker, microphone, and other user interface I/O components. The user interface may be used to select and start and stop content streaming triggering the START and STOP messages. In one embodiment the controller 716 provides functionality send the START and STOP messages as described herein. In the illustrated embodiment the controller utilizes software functionality 730 stored in memory 724 to implement at least a portion of the control flow shown, e.g., in FIG. 5 that is necessary to generate the START and STOP messages and to respond to retuning messages. While software may be used to implement aspects of START/STOP and retuning in the UE, some aspects, such as sending START and STOP messages and receiving retuning messages and tuning to a different channel utilize at least some hardware circuits and the particular segmentation between software and hardware control is implementation specific and thus can vary in different embodiments.

While the description above has applied to cells starting and stopping content streaming in a particular cell, similar evaluations may be made by BTAS 101 when a UE travels from one cell site to another. Referring to FIG. 8, three cells 801, 802, and 803, are served by eNodeBs 107*a*, 107*b*, and 107*c*. UE 111 may be receiving a broadcast (or unicast) content stream in cell 803 from eNodeB 107*b*. When the UE travels from cell 803 to cell 801, the handover procedures include informing the BTAS of the handover. The handover procedures may include UE sending a START message to the BTAS identifying the cell ID of the target cell 801 and the content stream. The handover procedures may further include the UE sending a STOP message to the BTAS identifying the cell ID of the source cell 803 and the content stream. In another embodiment the UE sends a START message with information elements that identify the cell IDs of the source cell 803 and the target cell 801 and an information element that identifies the message as a START/Handover message. Identifying the source cell, the target cell, and the content stream in the START/Handover message allows for more efficient signaling by avoiding the need for a separate STOP message.

Figure 9B:
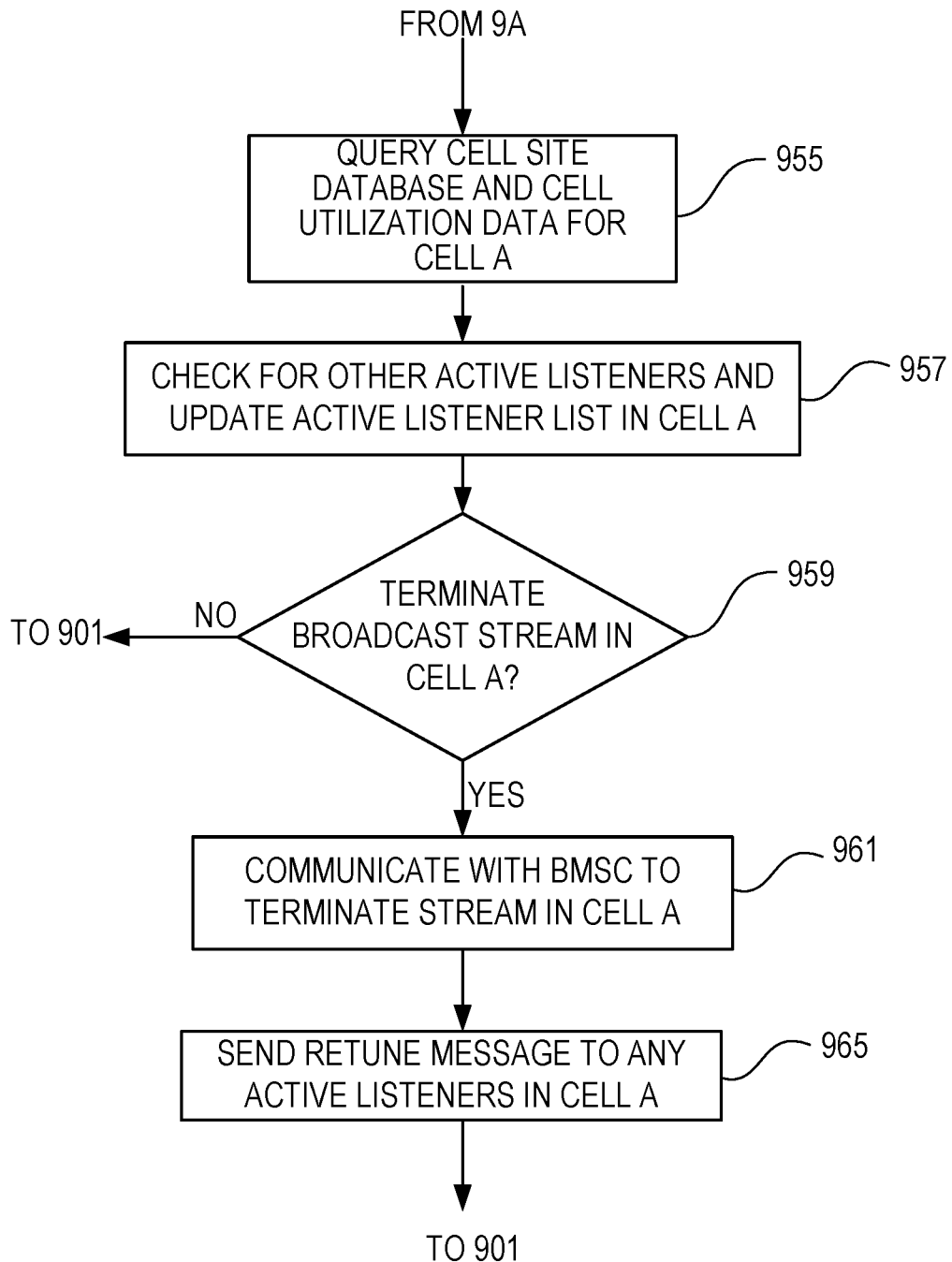
FIG. 9B illustrates a flow diagram illustrating an aspect of active user tracking for a source cell in response to a handover.

FIG. 9A illustrates the operation of the BTAS in response to receipt of a START/Handover message. In handover contexts where separate START and STOP messages are utilized, the BTAS operates as shown in FIGS. 3 and 4. Referring to FIG. 9A, in response to receipt of a START/Handover message BTAS 101 performs similar control functions as if the BTAS received a START message for the target cell and a STOP message for the source cell. In 901 the BTAS 101 waits for a START/Handover message. When the START/Handover message is received by the BTAS the BTAS takes similar actions for the target cell as if it had received a regular START message from the UE. The BTAS queries the cell site database for cell ID information and cell utilization for the target cell B in 903 and checks for the number of active listeners and updates the active listener list for cell B in 905. In 907, the BTAS determines whether the content stream is already being broadcast in cell B. If so, then the BTAS sends a retune message to the UE (if needed) to tune to the broadcast channel being used in cell B. If the broadcast channel being used in cell A and cell B is the same no retune message is needed and the flow continues to 955 (FIG. 9B). If the content stream is not being broadcast, the BTAS determines in 909 whether to initiate a broadcast based on the number of active listeners and the cell utilization. If the BTAS decides to initiate the broadcast, in 911 the BTAS communicates with the BMSC to initiate the stream in cell B and sends a retune message to the active listeners in cell B in 915. The flow then goes to 955 in FIG. 9B to account for the reduction of an active listener in source cell site A. The BTAS may also decide in 909 not to initiate a broadcast based on the number of active listeners and/or based on cell utilization criteria. If the NO path is taken in 909 the BTAS sends a retune message to the UE if needed to retune to a unicast channel for cell B. The BTAS then proceeds to 955 in FIG. 9B.

Referring to FIG. 9B, BTAS 101 queries the cell site database for cell ID information and cell utilization data for cell site A in 955, checks for other active listeners and updates the active listener list for cell site A in 957 and decides whether to terminate the broadcast stream in cell A in 959. If not, BTAS 101 returns to 901. If yes, BTAS communicates with BMSC to terminate the stream in cell A and sends a retune message to remaining active listeners in cell A and then returns to 901.

The use of the START/STOP messages enhances network resources efficiency through dynamic enablement of broadcast channels. For example, the first user in a cell site starts viewing the content as a unicast operation. As more users tune to the same channel under the same cell site, broadcast/multicast may be enabled by the BTAS. By providing a mechanism to monitor active users of broadcast/multicast services as described herein and map such cell-service resources in real time and provide that information to the back-end application servers, utilization of radio resources can be improved resulting in improved end users service quality. Providing monitoring of active listeners allows more efficient use of scare spectrum resources and dynamic allocation of broadcast and unicast resources based on actual utilization. That can lead to more efficient schemes in a large radio-carrier operator environment resulting in significant savings in both capital expenditures and operating expenses. Such savings can be found in less need for additional spectrum, deployment of a fewer cell sites, antennas, tower real estate and associated software licensing costs.

Thus, aspects of monitoring active users of multicast/broadcast services have been described. The description set forth herein is illustrative, and is not intended to limit the scope of the following claims. Variations and modifications of the embodiments disclosed herein may be made based on the description set forth herein, without departing from the scope and spirit of the following claims.

What is claimed is:

1. A method comprising:
   receiving at a broadcast multicast tracking application a start message sent from a first user equipment to the broadcast multicast tracking application, the start message including information indicative of a cell site in which the first user equipment is located and a channel identification indicative of a content stream that the first user equipment receives over a unicast channel;
   responsive to the start message, increasing a number of active listeners in the cell site receiving the content stream corresponding to the channel identification;
   initiating a broadcast stream to the first user equipment based at least in part on the number of active listeners receiving the content stream corresponding to the channel identification;
   sending a message to the first user equipment to retune to a broadcast channel carrying the content stream from the unicast channel carrying the content stream;
   responsive to receiving at the broadcast multicast tracking application a stop message from the first user equipment indicating a voluntary termination of receiving the content stream over the broadcast channel, reducing the number of active listeners, the stop message including information indicative of the cell site in which the first user equipment is located and an indication of the content stream;
   responsive to receiving the stop message at the broadcast multicast tracking application, evaluating whether to terminate the broadcast stream based, at least in part, on the stop message; and
   the broadcast multicast tracking application polling network equipment to extract location information of the first user equipment if the first user equipment has not sent the stop message after a predetermined time threshold.

2. The method as recited in claim 1 further comprising sending one or more additional messages respectively to one or more additional user equipment constituting a portion of the active listeners to retune to the broadcast channel from one or more other unicast channels carrying the content stream.

3. The method as recited in claim 1, further comprising:
   the broadcast multicast tracking application querying a radio access network cell-site data base based on the information indicative of the cell site in which the first user equipment is located for cell identification information related to the cell site.

4. The method as recited in claim 1, further comprising:
   the broadcast multicast tracking application querying radio access network utilization information to determine utilization information of the cell site and the initiating of the broadcast stream is further based on the utilization information of the cell site.

5. The method as recited in claim 1, wherein the message sent to the first user equipment to retune to the broadcast channel is sent from the broadcast multicast tracking application.

6. The method as recited in claim 1, further comprising the broadcast multicast tracking application causing the broadcast stream to be terminated responsive to, at least in part, the stop message.

7. The method as recited in claim 1, further comprising the broadcast multicast tracking application causing the broadcast stream to be terminated responsive to, at least in part, the stop message and a number of remaining active listeners being below a threshold.

8. The method as recited in claim 1, further comprising the broadcast multicast tracking application causing the broadcast stream to be terminated responsive to, at least in part, the stop message and cell utilization.

9. The method as recited in claim 1, further comprising after receipt of the stop message the broadcast multicast tracking application not terminating the broadcast stream responsive to, at least in part, a number of remaining listeners.

10. The method as recited in claim 1 further comprising the broadcast multicast tracking application ensuring a mapping of the cell site to a broadcast serving area for the broadcast channel identified in the stop message by using information from a radio network management system including broadcast channel information.

11. The method as recited in claim 1 further comprising:
    the broadcast multicast tracking application ensuring authenticity of the information indicative of the cell site in the stop message, at least in part, by using information received from a cell-site data base.

12. An apparatus comprising:
    a processor; and
    a memory in communication with the processor, the memory comprising computer-executable instructions that, when executed by the processor, cause the processor to perform broadcast multicast tracking application operations including,
    responsive to receiving a message sent from first user equipment, the message including information indicative of a cell site in which the first user equipment is located and a channel identification indicative of a content stream that the first user equipment receives over a unicast channel, updating a number of active listeners receiving the content stream;
    causing a broadcast stream to be initiated to the first user equipment based, at least in part, on the number of active listeners being above a threshold;
    causing a message to be sent to the first user equipment to retune to a broadcast channel carrying the content stream from the unicast channel carrying the content stream;
    responsive to receipt of a stop message from the first user equipment indicating a voluntary termination of receiving the content stream over the broadcast channel, the stop message including information indicative of the cell site in which the first user equipment is located and the channel identification indicative of the content stream, ensuring authenticity of the information indicative of the cell site in the stop message, at least in part, by using information received from a cell-site data base;
    responsive to receipt of the stop message, determining a number of remaining active listeners in the cell site receiving the content stream over the broadcast channel and determining to terminate the broadcast stream based, at least in part, on the number of remaining active listeners being below a threshold; and responsive to the first user equipment not sending a stop message after a predetermined time threshold, the broadcast multicast tracking application polling network equipment to extract location information for the first user equipment.

13. The apparatus as recited in claim 12 wherein the computer-executable instructions further cause, when executed by the processor, one or more additional messages respectively to be sent to one or more additional user equipment constituting a portion of the number of active listeners to retune to the broadcast channel from one or more other unicast channels carrying the content stream.

14. The apparatus as recited in claim 12, wherein the computer-executable instructions further cause, when executed by the processor, a query to be made to obtain radio access network utilization information to determine utilization information of the cell site and wherein initiation of the broadcast stream is further based on the utilization information of the cell site.

15. The apparatus as recited in claim 12, wherein the computer-executable instructions further cause, when executed by the processor, in response to receipt of the stop message, a determination of cell utilization and determining to terminate the broadcast stream is further based, at least in part, on the cell utilization.

16. A method comprising:

receiving at a broadcast multicast tracking application a start message sent from a first user equipment to the broadcast multicast tracking application, the start message including information indicative of a cell site in which the first user equipment is located and a channel identification indicative of a content stream;

initiating a broadcast stream to the first user equipment based at least in part on a number of active listeners receiving the content stream corresponding to the channel identification;

sending a tune message to the first user equipment to tune to a broadcast channel carrying the content stream; and the broadcast multicast tracking application polling network equipment to extract location information for the first user equipment responsive to the first user equipment not sending a stop message after a predetermined time threshold, the stop message to include information indicative of the cell site in which the first user equipment is located and an indication of the content stream.

17. The method as recited in claim 16 wherein the network equipment comprises a packet data network gateway.

* * * * *